United States Patent
Serizawa

(10) Patent No.: US 7,782,501 B2
(45) Date of Patent: Aug. 24, 2010

(54) LIGHT-ORIENTATION ADJUSTING UNIT, OPTICAL WRITING UNIT HAVING LIGHT-ORIENTATION ADJUSTING UNIT, AND IMAGE FORMING APPARATUS HAVING OPTICAL WRITING UNIT

(75) Inventor: Keiichi Serizawa, Yokohama (JP)

(73) Assignee: Ricoh Company, Tokyo (JP)

( * ) Notice: Subject to any disclaimer, the term of this patent is extended or adjusted under 35 U.S.C. 154(b) by 973 days.

(21) Appl. No.: 11/585,961

(22) Filed: Oct. 25, 2006

(65) Prior Publication Data

US 2007/0098460 A1 May 3, 2007

(30) Foreign Application Priority Data

Oct. 27, 2005 (JP) .............................. 2005-312918

(51) Int. Cl.
*H04N 1/04* (2006.01)

(52) U.S. Cl. ..................... 358/474; 358/475; 358/496; 358/497

(58) Field of Classification Search .................. 358/474, 358/475, 496, 497, 498
See application file for complete search history.

(56) References Cited

U.S. PATENT DOCUMENTS

| 2005/0052719 A1 | 3/2005 | Tomita | |
|---|---|---|---|
| 2006/0132880 A1* | 6/2006 | Amada et al. ............... | 359/196 |

FOREIGN PATENT DOCUMENTS

| JP | 08-286134 | 11/1996 |
|---|---|---|
| JP | 2002-148551 | 5/2002 |
| JP | 2002-182145 | 6/2002 |
| JP | 2002-258189 | 9/2002 |
| JP | 2003-255245 | 9/2003 |
| JP | 2005-266762 | 9/2005 |

OTHER PUBLICATIONS

European Office Action for corresponding case.
European Office Action dated Sep. 22, 2009.

* cited by examiner

*Primary Examiner*—Houshang Safaipour
(74) *Attorney, Agent, or Firm*—Harness, Dickey & Pierce, P.L.C.

(57) ABSTRACT

A light-orientation adjusting unit for use with a light-receiving member includes an optical unit, a posture control unit, a first unit supporter, and a second unit supporter. The optical unit passes through a light beam toward the light-receiving member. The posture control unit controls the posture of the optical unit to adjust an inclination of scanning line to be formed on the light-receiving member by the light beam. The first unit supporter regulates a movement of the optical unit within a given range by contacting the first unit supporter to the optical unit. The second unit supporter regulates a movement of the optical unit within a given range by contacting the second unit supporter to the optical unit. The first unit supporter including a first biasing member and second unit supporter including a second biasing member are disposed on a first and second ends of the optical unit, respectively.

20 Claims, 12 Drawing Sheets

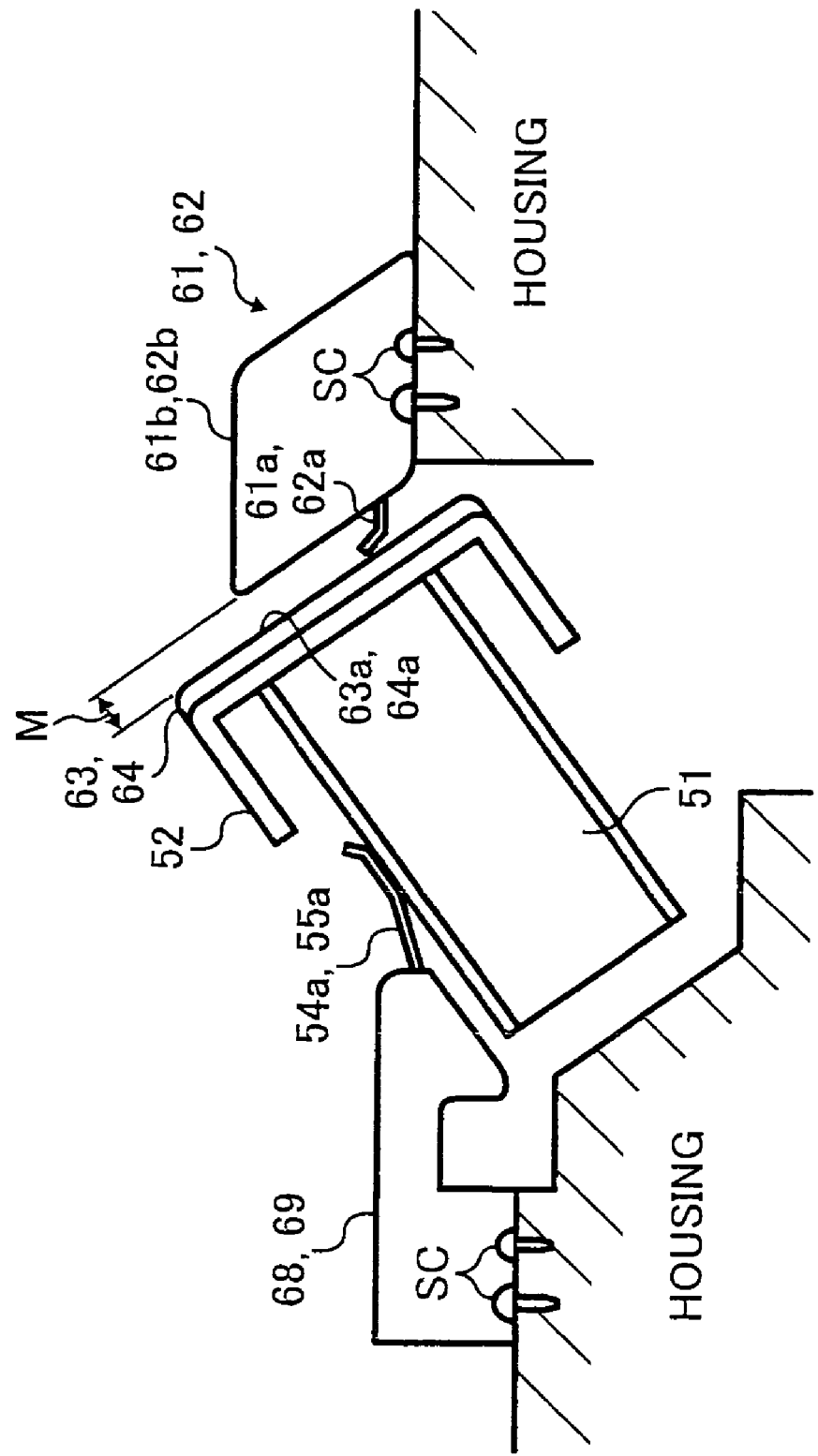

LIGHT-ORIENTATION ADJUSTING UNIT, OPTICAL WRITING UNIT HAVING LIGHT-ORIENTATION ADJUSTING UNIT, AND IMAGE FORMING APPARATUS HAVING OPTICAL WRITING UNIT

PRIORITY STATEMENT

This patent specification is based on and claims priority under 35 U.S.C. §119 on Japanese patent application No. 2005-312918 filed on Oct. 27, 2005 in the Japanese Patent Office, the entire contents of which are incorporated herein by reference.

TECHNICAL FIELD

The present disclosure generally relates to an image forming apparatus, and more particularly to an image forming apparatus having an optical writing unit having a light-orientation adjusting unit for adjusting an inclination of scanning line.

BACKGROUND

An image forming apparatus such as copier, printer, and facsimile may include an optical writing unit (or optical scanning unit) to scan a surface of an image carrier with a light beam, based on original image information, to form a latent image on the image carrier. The latent image can be later developed as toner image.

Such optical writing unit (or optical scanning unit) includes a light source, a polygon mirror, and optical elements such as lens, for example.

A light beam emitted from the light source can be deflected by the polygon mirror, and then focused on the image carrier via the optical elements such as lens. In other words, the light beam scans the surface of the image carrier with such process.

In such optical writing unit, a scanning line formed on the image carrier by the light beam may be curved or inclined with respect to a correct condition by several factors. Such factors may include physical property of optical elements, distortion of housing of the optical writing unit, parts deformation by heat such as heat-accumulated polygon motor, installation distortion of the image carrier, for example.

FIG. 1 schematically shows a curving or inclination of scanning line formed on an image carrier such as photoconductive member. Such curving or inclination of scanning line may occur due to the above-mentioned factors.

An amount of curving or inclination of scanning line may vary depending on conditions of image forming apparatuses, and is in a range of μm order, in general. For example, such curving or inclination may be in a range of 15 μm to 50 μm for one condition, and 150 μm to 200 μm for another condition.

Such curving or inclination of scanning line may cause unfavorable effect as below.

For example, when the scanning line may be curved or inclined with respect to a correct condition, a latent image may not be correctly formed on the image carrier, by which an incorrect image may be formed on a recording medium.

In case of a monochrome image forming or single-color image forming, a little amount of curving and inclination of scanning line may not cause a degradation on image quality, and thereby a user may not recognize an image formed on a recording medium as abnormal image.

However, in case of a color image forming apparatus of a tandem arrangement type using a plurality of image carriers for superimposing a plurality of color images on a recording medium, an inclination deviation of scanning lines between the plurality of image carriers may cause a degradation on image quality even if such inclination deviation of scanning lines is not so significant, and thereby a user may recognize an image formed on a recording medium as abnormal image.

A background art optical scanning unit, which may adjust a curving of scanning line, is shown in FIG. 2. FIG. 2 is a schematic cross-sectional view of a long-shaped plastic lens in a background optical scanning unit.

The optical scanning unit includes a light source such as plurality of LD (laser diode) units (not shown), a long-shaped plastic lens 151, a lens holder 152, and a housing 166, for example. As shown in FIG. 2, the lens holder 152 holds the long-shaped plastic lens 151.

The long-shaped plastic lens 151 can be disposed in a light path of a light beam emitted from the light source. The light beam passed through the long-shaped plastic lens 151 scans a surface of an image carrier such as photoconductive member.

As also shown in FIG. 2, the optical scanning unit also includes adjustment screws 158a and 158b. The adjustment screws 158a and 158b can be used to integrally tilt the long-shaped plastic lens 151 and lens holder 152 in a given direction to correct an inclination of scanning line formed on an image carrier such as photoconductive member.

Specifically, by rotating the adjustment screws 158a or 158b, the long-shaped plastic lens 151 can be tilted in a right or left side in FIG. 2, by which a posture of long-shaped plastic lens 151 may be changed. If the posture of long-shaped plastic lens 151 is changed, an inclination of scanning line on the image carrier may be changed.

Accordingly, the long-shaped plastic lens 151 can function as an adjustment device for adjusting an inclination of scanning line, formed on the image carrier. In other words, an inclination of scanning line on the image carrier can be adjusted by adjusting a posture of long-shaped plastic lens 151.

In such optical scanning unit, the adjustment screws 158a and 158b are rotatable to change the posture of the long-shaped plastic lens 151 as above-mentioned.

In general, an inclination of scanning line can be adjusted by adjusting the posture of the long-shaped plastic lens 151 with the adjustment screws 158a and 158b before shipping an image forming apparatus from a factory.

When such image forming apparatus is used in a user environment over the time, such image forming apparatus may need adjustment of an inclination of scanning line formed on an image carrier. In such a case, a maintenance person may manually rotate the adjustment screws 158a and 158b to adjust an inclination of scanning line although such manual work may not be a user-friendly operation.

FIG. 3 shows another adjusting unit for adjusting an inclination of scanning line.

FIG. 3 shows a lens unit 250 including a long-shaped lens 251, and a bracket 252. The bracket 252 holds the long-shaped lens 251.

As also shown in FIG. 3, the adjusting unit further includes a drive motor 256, and a screw 258. The screw 258 is attached to a shaft of the drive motor 256.

When the screw 258 is moved in an upward direction in FIG. 3, the lens unit 250 can be moved in a direction shown by an arrow D at the drive motor 256 side of the lens unit 250.

Specifically, when the screw 258 is moved in an upward direction in FIG. 3, the lens unit 250 can be moved in an upward direction against a biasing force of a leaf spring 261 at the drive motor 256 side of the lens unit 250. With such upward movement of the lens unit 250, the lens unit 250 may tilt toward a right side using a support member 266 as fulcrum, by which a posture of the lens unit 250 can be changed.

On one hand, when the up-and-down screw 258 is moved in a downward direction in FIG. 3, the lens unit 250 can be moved in a downward direction with biasing force of the leaf spring 261 at the drive motor 256 side of the lens unit 250. With such downward movement of the lens unit 250, the lens unit 250 may tilt toward a left side using the support member 266 as fulcrum, by which a posture of the lens unit 250 can be changed.

An image forming apparatus having such adjusting unit may form a latent image of test image pattern on an image carrier such as photosensitive member at a given timing. The image forming apparatus develops the test image pattern (i.e., latent image) as toner mage by conducting an actual operation process. Then, a pattern sensor (e.g., optical sensor) checks the test image pattern (i.e., toner image).

Based on a result detected by the pattern sensor (e.g., optical sensor), a central processing unit (CPU) controls a rotation angle of the drive motor 256 to change a posture of the lens unit 250.

With such configuration, an inclination of scanning line on the image carrier such as photosensitive member can be adjusted to a given value. Furthermore, such adjustment of the scanning line can be automatically conducted, and thereby a maintenance personnel may not be in need for adjusting an inclination of scanning line.

However, the above-mentioned related art may have drawbacks as below.

Firstly, a range for changing the posture of the lens unit 250 by moving the screw 258 with a rotation of the drive motor 256 may exceed an adjustment effective range of the lens unit 250, wherein the adjustment effective range may be determined by several factors such as optical or physical property of optical parts, for example.

If the posture change range of the lens unit 250 may exceed the adjustment effective range of the lens unit 250, an incidence light may not enter the lens unit 250 with an appropriate angle, by which an adjustment of scanning line may not be conducted properly.

Secondly, an external shock, which may occur to an image forming apparatus having an adjusting unit during a shipment or transportation of image forming apparatus, may cause unfavorable effect.

For example, such external shock may significantly moves the drive motor 256 side of the lens unit 250 although the leaf spring 261 applies biasing force to the drive motor 256 side of the lens unit 250. In such a case, the screw 258 may be disengaged from the lens unit 250 for a short period of time, and then the screw 258 may contact the lens unit 250 again with biasing force of the leaf spring 261.

If the screw 258 and the lens unit 250 can be contacted again with an original condition, which is set in the factory, the image forming apparatus may conduct an image forming operation without trouble.

However, if the screw 258 and the lens unit 250 cannot be contacted again with the original condition, which is set in the factory, or if the leaf spring 261 deforms plastically, the image forming apparatus may have a trouble for conducting an image forming operation.

If the screw 258 and the lens unit 250 cannot be contacted again with the original condition, or if the leaf spring 261 deforms plastically, the lens unit 250 may not be correctly moved in an upward or downward direction by the screw 258 driven by the drive motor 256.

Accordingly, an adjustment of scanning line may not be conducted properly because the screw 258 and the lens unit 250 may not contact each other with the original condition due to an external shock.

SUMMARY

At least one embodiment of the present disclosure relates to a light-orientation adjusting unit for use with a light-receiving member. The light-orientation adjusting unit includes an optical unit, a posture control unit, a unit supporter, and a second unit supporter. The optical unit passes through a light beam toward the light-receiving member. The posture control unit controls the posture of the optical unit to adjust an inclination of scanning line to be formed on the light-receiving member by the light beam.

The first unit supporter regulates a movement of the optical unit within a given range by contacting the first unit supporter to the optical unit. The second unit supporter regulates a movement of the optical unit within a given range by contacting the second unit supporter to the optical unit. The first unit supporter including a first biasing member and second unit supporter including a second biasing member are disposed on a first and second end of the optical unit, respectively.

At least one embodiment of the present disclosure also relates to an optical writing unit for use with a light-receiving member. The optical writing unit includes a light source, an optical device, and a light-orientation adjusting unit. The light source emits a light beam. The optical device controls and guides a light path of the light beam, emitted from the light source, to a surface of the light-receiving member. The light-orientation adjusting unit adjusts an inclination of scanning line formed on the light-receiving member by the light beam. The light-orientation adjusting unit includes an optical unit, a posture control unit, a first unit supporter, and a second unit supporter. The optical unit passes through a light beam toward the light-receiving member. The posture control unit controls the posture of the optical unit to adjust an inclination of scanning line to be formed on the light-receiving member by the light beam.

The first unit supporter regulates a movement of the optical unit within a given range by contacting the first regulating member to the optical unit. The second unit supporter regulates a movement of the optical unit within a given range by contacting the second unit supporter to the optical unit. The first unit supporter including a first biasing member and second unit supporter including a second biasing member are disposed on a first and second ends of the optical unit, respectively.

At least one embodiment of the present disclosure also relates to an image forming apparatus. The image forming apparatus includes an image carrier, an optical writing unit, a developing unit, and a transferring unit. The optical writing unit writes a latent image on a surface of the image carrier by scanning a light beam, corresponding to original image information. The optical writing unit includes a light source, an optical device, and a light-orientation adjusting unit. The light source emits a light beam. The optical device controls and guides a light path of the light beam, emitted from the light source, to a surface of the light-receiving member.

The light-orientation adjusting unit adjusts an inclination of scanning line formed on the light-receiving member by the light beam. The light-orientation adjusting unit includes an optical unit, a posture control unit, a first unit supporter, and a second unit supporter. The optical unit passes through a light beam toward the light-receiving member. The posture control unit controls the posture of the optical unit to adjust an inclination of scanning line to be formed on the light-receiving member by the light beam.

The first unit supporter regulates a movement of the optical unit within a given range by contacting the first unit supporter to the optical unit. The second unit supporter regulates a movement of the optical unit within a given range by contacting the second unit supporter to the optical unit. The first unit supporter including a first biasing member and second unit supporter including a second biasing member are disposed on a first and second end of the optical unit, respectively. The developing unit develops the latent image formed on the surface of the image carrier as visible image. The transferring unit transfers the visible image onto a recording medium.

BRIEF DESCRIPTION OF THE DRAWINGS

A more complete appreciation of the disclosure and many of the attendant advantages and features thereof can be readily obtained and understood from the following detailed description of example embodiments with reference to the accompanying drawings, wherein:

FIG. 15 is a schematic cross-sectional view of a lens unit of FIG. 9 for explaining positional relationships of a lens unit and regulating members.

DETAILED DESCRIPTION OF EXAMPLE EMBODIMENTS

Figure 1:
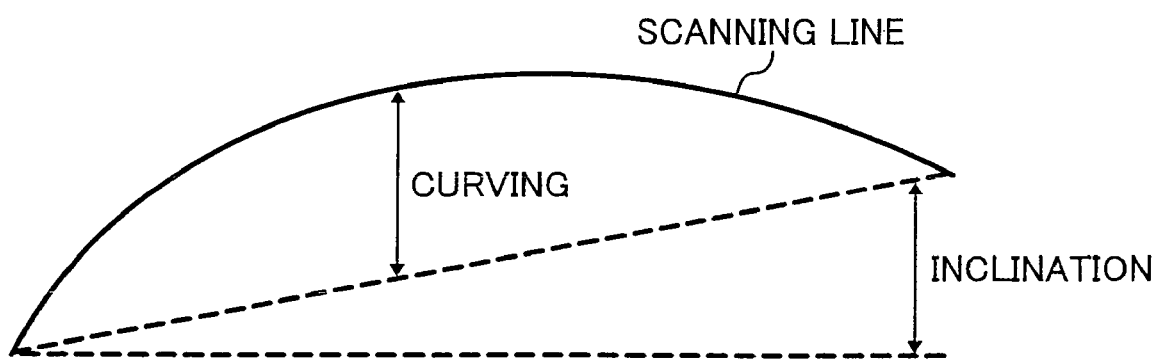
FIG. 1 schematically shows a curving or inclination of a scanning line on an image carrier.
Figure 2:
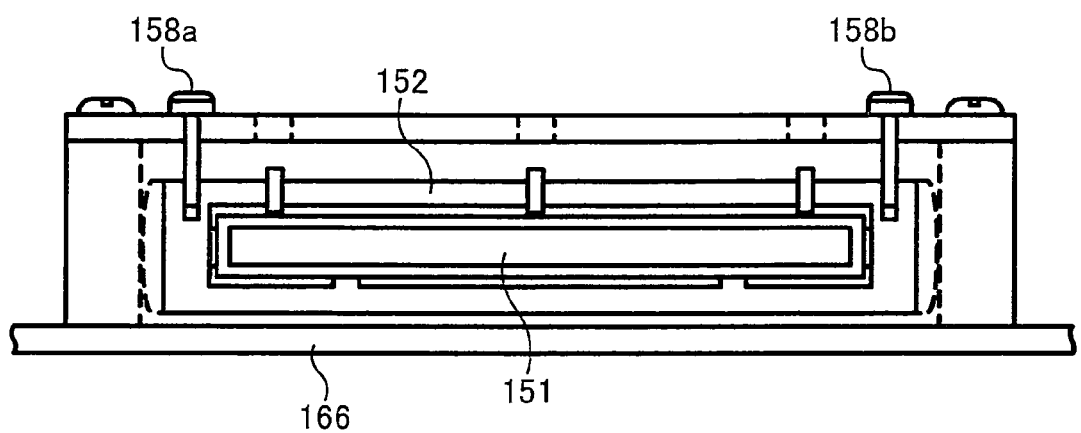
FIG. 2 is a schematic cross-sectional view of a conventional optical scanning unit having a long-shaped plastic lens.
Figure 3:
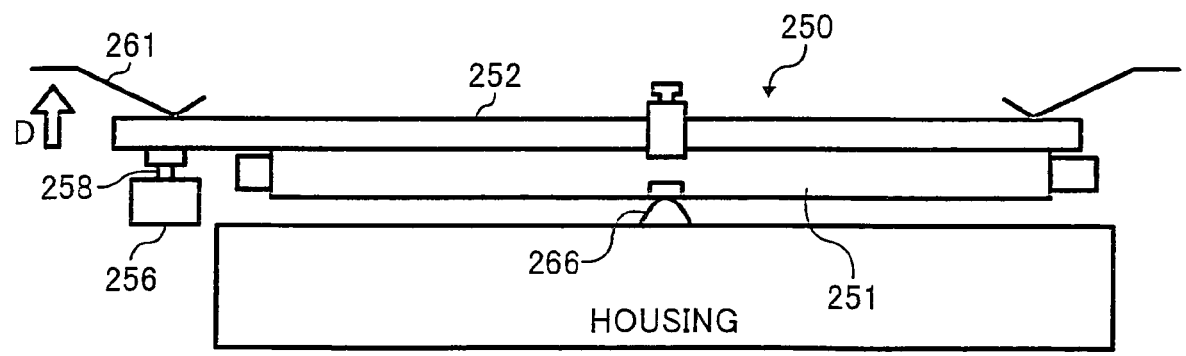
FIG. 3 is a schematic cross-sectional view of a related art optical scanning unit having a long-shaped plastic lens.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 4:
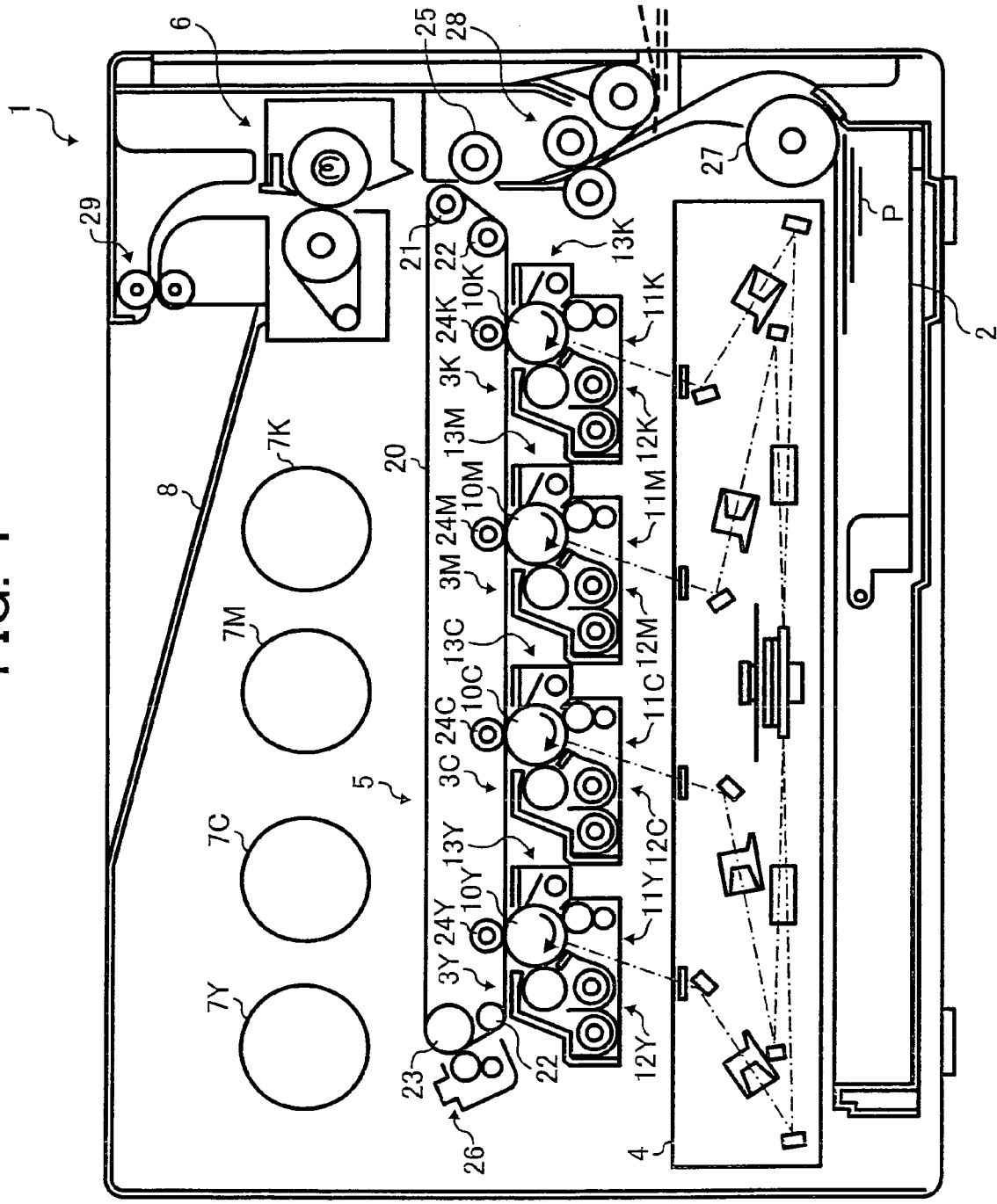
FIG. 4 is a schematic cross-sectional view of an image forming apparatus according to an example embodiment.

Referring now to the drawings, wherein like reference numerals designate identical or corresponding parts throughout the several views, an image forming apparatus according to an example embodiment is described with particular reference to FIG. 4.

FIG. 4 is a schematic cross-sectional view of an image forming apparatus 1 according to an example embodiment.

The image forming apparatus 1 may include a printer having a tandem arrangement and intermediate transfer method, but the image forming apparatus 1 may not be limited to such printer but may include other applications.

As show in the example embodiment of FIG. 4, the image forming apparatus 1 includes a sheet cassette 2, image-forming units 3Y, 3C, 3M, and 3K, an optical writing unit 4, an intermediate transfer unit 5, and a fixing unit 6, for example.

The sheet cassette 2 is withdrawable from the image forming apparatus 1. The image-forming units 3Y, 3C, 3M, and 3K are used to form toner images of yellow(Y), cyan(C), magenta(M), and black(K), respectively. Hereinafter, reference characters of Y, C, M, and K represent yellow, cyan, magenta, and black, respectively.

Figure 5:
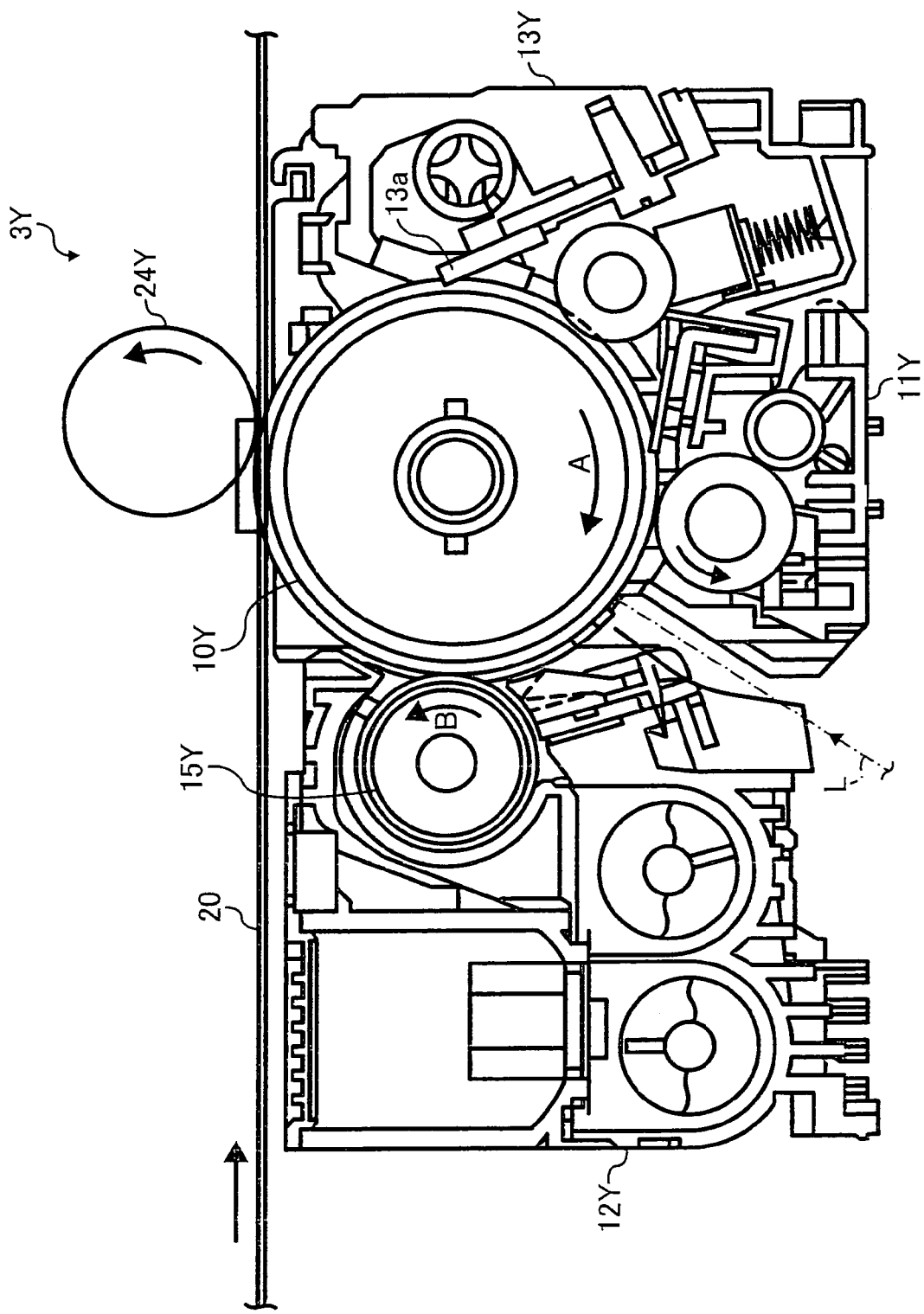
FIG. 5 is a schematic cross-sectional view of an image-forming unit in an image forming apparatus of FIG. 4.

FIG. 5 is a schematic cross-sectional view of the image-forming unit 3Y. The image-forming units 3Y, 3C, 3M, and 3K take a similar configuration one another except toner colors.

As shown in FIGS. 4 and 5, the image-forming units 3Y, 3C, 3M, and 3K include photosensitive members 10Y, 10C, 10M, and 10K, respectively.

The image-forming units 3Y, 3C, 3M, and 3K may further include charge units 11Y, 11C, 11M, and 11K, developing units 12Y, 12C, 12M, and 12K, and cleaning units 13Y, 13C, 13M, and 13K around the photosensitive members 10Y, 10C, 10M, and 10K, respectively.

The photosensitive members 10Y, 10C, 10M, and 10K having a drum shape can rotate in a direction shown by an arrow A as shown in FIG. 5. The photosensitive members 10Y, 10C, 10M, and 10K are used as an image carrier, which forms a latent image and a toner image thereon.

For example, each of the photosensitive members 10Y, 10C, 10M, and 10K can be made of a cylinder, made of aluminum having a diameter of 40 mm, and a photosensitive layer formed on the cylinder, wherein the photosensitive layer includes an organic photo conductor (OPC), for example.

The charge units 11Y, 11C, 11M, and 11K charge surfaces of the photosensitive members 10Y, 10C, 10M, and 10K, respectively.

The developing units 12Y, 12C, 12M, and 12K respectively develop latent images formed on the photosensitive members 10Y, 10C, 10M, and 10K as toner image.

The cleaning units 13Y, 13C, 13M, and 13K remove toners remaining on the photosensitive members 10Y, 10C, 10M, and 10K, respectively.

The optical writing unit 4, provided under the image-forming units 3Y, 3C, 3M, and 3K, emits a light beam L to the surface of the photosensitive members 10Y, 10C, 10M, and 10K. The optical writing unit 4 is used as optical scanning unit.

The intermediate transfer unit 5, provided over the image-forming units 3Y, 3C, 3M, and 3K, includes an intermediate transfer belt 20, to which toner images are transferred from the image-forming units 3Y, 3C, 3M, and 3K.

The fixing unit 6 fixes the toner images on a transfer sheet P, which receives the toner images from the intermediate transfer belt 20.

The image forming apparatus 1 further includes toner bottles 7Y, 7C, 7M, and 7K over the intermediate transfer unit 5 as shown in FIG. 4. The toner bottles 7Y, 7C, 7M, and 7K can store toners of yellow(Y), cyan(C), magenta(M), and black(K), respectively. The toner bottles 7Y, 7C, 7M, and 7K are removable from the image forming apparatus 1 by opening an ejection tray 8 of the image forming apparatus 1.

The optical writing unit 4 includes a light source (e.g., laser diode) and a polygon mirror, for example.

The light source (e.g., laser diode) emits the laser beam L, and the polygon mirror deflects the laser beam L. Then, the deflected laser beam L scans surfaces of the photosensitive members 10Y, 10C, 10M, and 10K.

The optical writing unit 4 will be explained in detail later.

In the intermediate transfer unit 5, the intermediate transfer belt 20 is extended by a drive roller 21, a tension roller 22, and a driven roller 23, and can be rotated in a counter-clockwise direction in FIG. 4 at a given timing.

As shown in FIG. 4, the intermediate transfer unit 5 includes primary transfer rollers 24Y, 24C, 24M, and 24K used for transferring toner images from the photosensitive members 10Y, 10C, 10M, and 10K to the intermediate transfer belt 20.

As shown in FIG. 4, the intermediate transfer unit 5 further includes a secondary transfer roller 25, which transfers the toner images from the intermediate transfer belt 20 to the transfer sheet P.

The intermediate transfer unit 5 further includes a belt cleaning unit 26, which removes toners remaining on the intermediate transfer belt 20 after the toner images are transferred from the intermediate transfer belt 20 to the transfer sheet P.

Hereinafter, a color image forming process in the image forming apparatus 1 is explained.

At first, the charge units 11Y, 11C, 1M, and 11K uniformly charge the surfaces of the photosensitive members 10Y, 10C, 10M, and 10K, respectively.

Then, the optical writing unit 4 scans the surfaces of the photosensitive members 10Y, 10C, 10M, and 10K with the laser beam L, generated based on original image information, to form latent images on the surfaces of the photosensitive members 10Y, 10C, 10M, and 10K.

The latent images formed on the surfaces of the photosensitive members 10Y, 10C, 10M, and 10K are developed as toner image by supplying toners from developing rollers 15Y, 15C, 15M, and 15K in the developing units 12Y, 12C, 12M, and 12K to the surface of the photosensitive members 10Y, 10C, 10M, and 10K, respectively.

The toner images formed on the photosensitive members 10Y, 10C, 10M, and 10K are superimposingly transferred to the intermediate transfer belt 20, rotating in a counter-clockwise direction in FIG. 4, with an effect of the primary transfer rollers 24Y, 24C, 24M, and 24K. The primary transfer rollers 24Y, 24C, 24M, and 24K conduct such primary transfer operation with a given timing each other so that toner images of each color can be correctly superimposed on the intermediate transfer belt 20.

After such primary transfer operation, the each surface of the photosensitive members 10Y, 10C, 10M, and 10K is cleaned by a cleaning blade 13a of the cleaning units 13Y, 13C, 13M, and 13K, by which the photosensitive members 10Y, 10C, 10M, and 10K are prepared for a next image forming operation.

Toners stored in toner bottles 7Y, 7C, 7M, and 7K can be supplied to the developing units 12Y, 12C, 12M, and 12K in the image-forming units 3Y, 3C, 3M, and 3K through a transport route (not shown), as required.

The transfer sheet P in the sheet cassette 2 is fed to a paired-registration roller 28 in the image forming apparatus 1 by a feed roller 27, provided near the sheet cassette 2.

The paired-registration roller 28 can feed the transfer sheet P to the second transfer roller 25 at a given timing so that the toner images can be transferred from the intermediate transfer belt 20 to the transfer sheet P.

Then, the transfer sheet P is transported to the fixing unit 6 to fix toner images on the transfer sheet P, and then the transfer sheet P is ejected to the ejection tray 8 by an ejection roller 29.

After the toner images are transferred from the intermediate transfer belt 20 to the transfer sheet P, the belt cleaning unit 26 removes toners remaining on the intermediate transfer belt 20.

Hereinafter, the optical writing unit 4 is explained with reference to FIG. 6.

Figure 6:
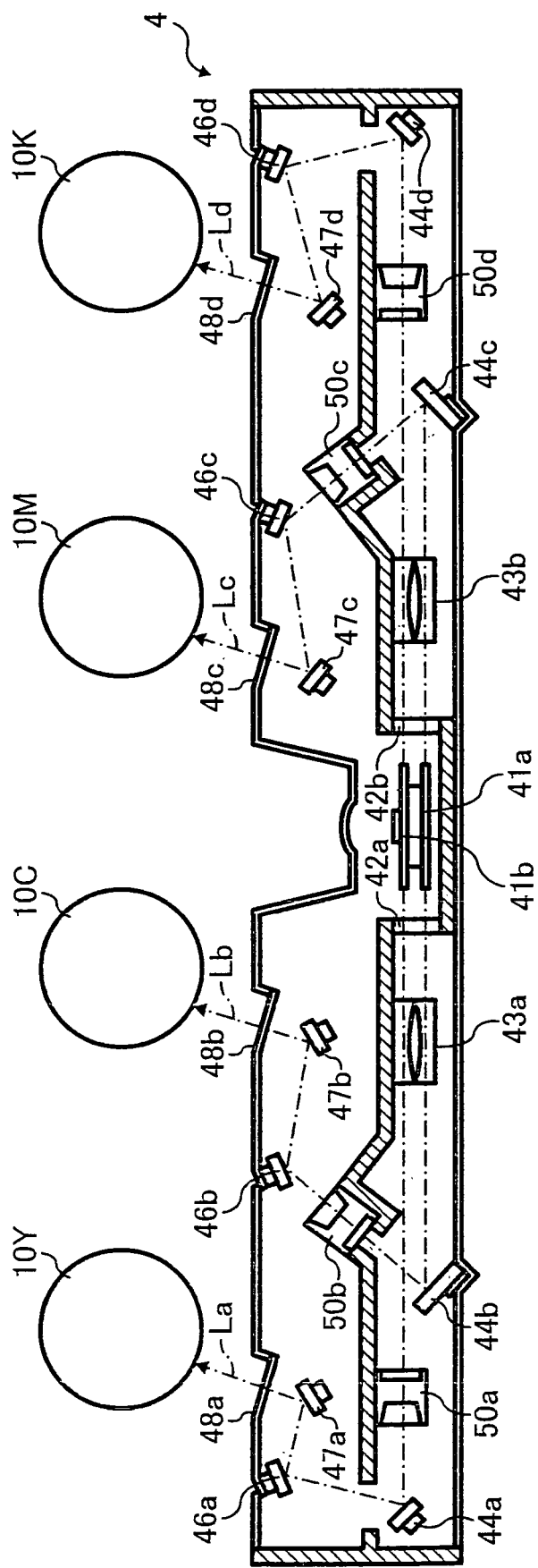
FIG. 6 is a schematic cross-sectional view of an optical writing unit in an image forming apparatus of FIG. 4.

As shown in FIG. 6, the optical writing unit 4 includes polygon mirrors 41a and 41b, which have a regular polygonal shape such as hexagonal shape when viewed from an axis direction of polygon mirror.

Each of the polygon mirrors 41a and 41b has a plurality of side faces used as reflecting mirrors, and can be rotated at a higher speed by a polygon motor (not shown).

A laser beam emitted from a light source such as laser diode (not shown) is deflected on the side faces (or reflecting mirrors) of the polygon mirrors 41a and 41b, and such deflected laser beam La, Lb, Lc, and Ld can be used to scan the surfaces of the photosensitive members 10Y, 10C, 10M, and 10K. Hereinafter, the laser beam La, Lb, Lc, and Ld is simply referred to laser beam L.

The optical writing unit 4 further includes soundproof glasses 42a and 42b, f-theta lenses 43a and 43b, mirrors 44a, 44b, 44c, 44d, 46a, 46b, 46c, 46d, 47a, 47b, 47c, 47d, lens units 50a, 50b, 50c, and 50d, and dust-proof glasses 48a, 48b, 48c, and 48d.

The soundproof glasses 42a and 42b is used to insulate noise generated by the polygon motor.

The f-theta lenses 43a and 43b convert equiangular movement of laser beam reflected by the polygon mirrors 41a and 41b to uniform linear motion.

The 44a, 44b, 44c, 44d, 46a, 46b, 46c, 46d, 47a, 47b, 47c, 47d are used to guide the laser beam L to the photosensitive members 10Y, 10C, 10M, and 10K.

The dust-proof glasses 48a, 48b, 48C, and 48d prevent an intrusion of dust into a housing of the optical writing unit 4.

The lens unit 50a, 50b, 50c, and 50d are used to adjust an inclination of scanning line, which will be described later. The lens unit 50a, 50b, 50c, and 50d take a similar configuration one another, therefore, the lens unit 50a, 50b, 50c, and 50d are simply referred to lens unit 50 hereinafter.

Hereinafter, a configuration of light-orientation adjusting unit of the optical writing unit 4 is explained, wherein the light-orientation adjusting unit can adjust an inclination of scanning line. The light-orientation adjusting unit can also adjust a curving of scanning line.

As described later in this specification, in an example embodiment, a curving of scanning line can be adjusted by forcibly deforming a lens of the lens unit 50, and an inclination of scanning line can be adjusted by changing a posture of the lens unit 50.

In an example embodiment, the lens units 50a, 50b, 50c, and 50d include an adjuster for adjusting curving of scanning line.

In an example embodiment, the lens units 50a, 50b, and 50c, respectively corresponding to the photosensitive members 10Y, 10C, and 10M for yellow(Y), cyan(C), and magenta (M), include a light-orientation adjusting unit for adjusting an inclination of scanning line. However, the lens unit 50d corresponding to the photosensitive member 10K for black(K) does not include a light-orientation adjusting unit for adjusting an inclination of scanning line. Accordingly, an adjustment of inclination of scanning line may be conducted for the lens units 50a, 50b, and 50c while using scanning line formed by the lens unit 50d as reference.

The lens unit 50a, 50b, 50c, and 50d take a similar configuration one another, therefore, the lens unit 50a, 50b, 50c, and 50d are simply refereed to lens unit 50, hereinafter.

Figure 7:
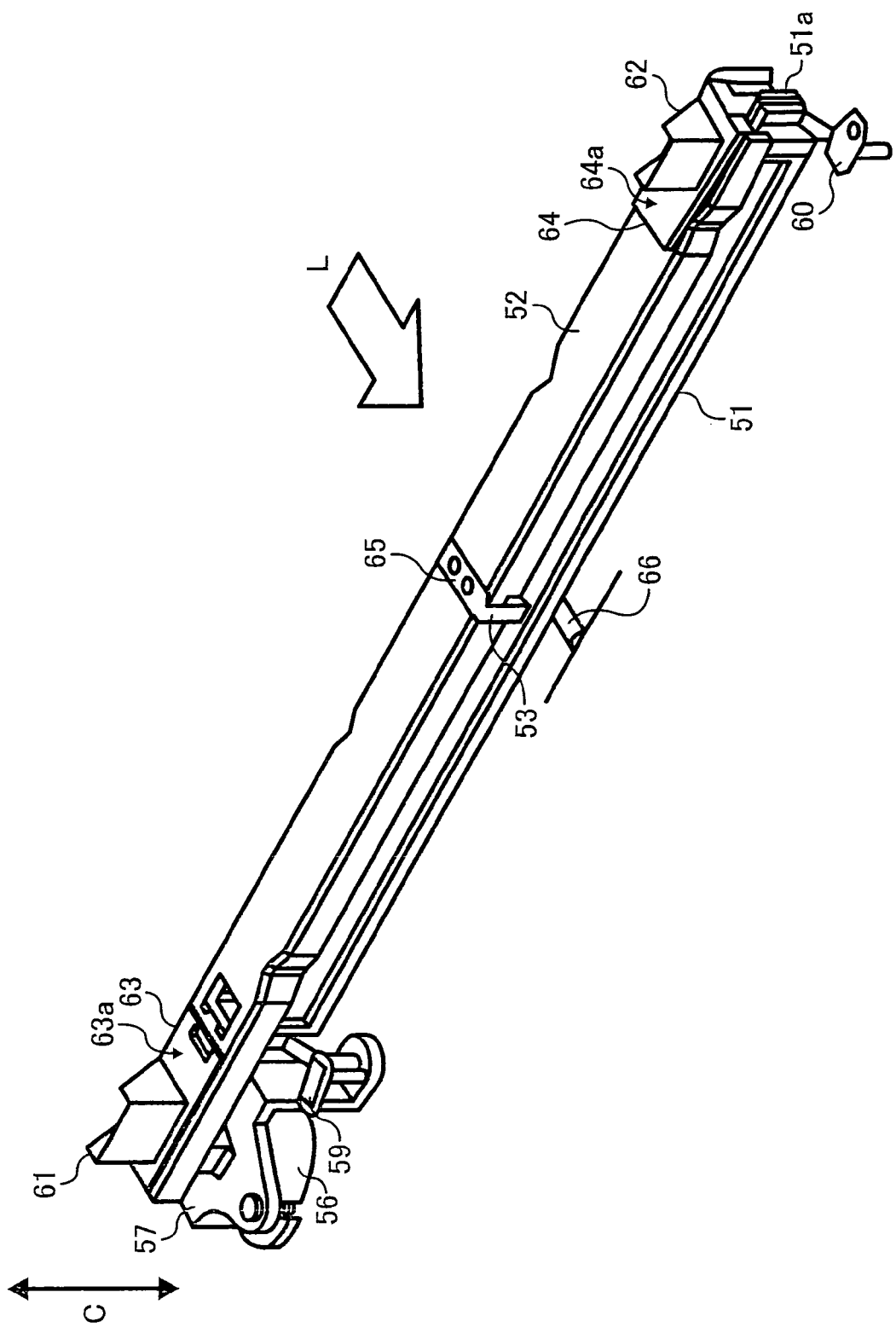
FIG. 7 is a perspective view of a lens unit according to an example embodiment, used in an optical writing unit of FIG. 6.
Figure 8:
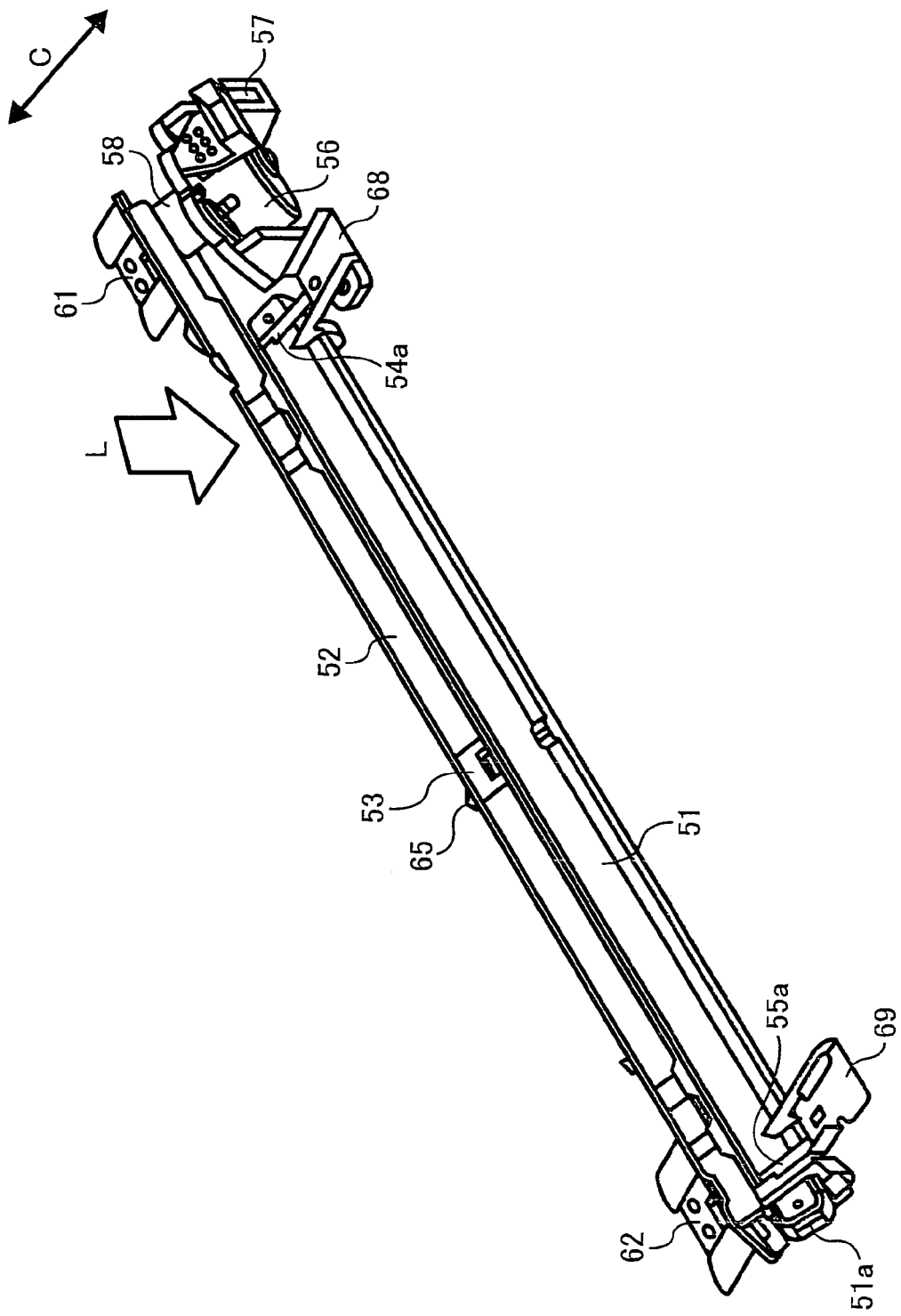
FIG. 8 is another perspective view of a lens unit of FIG. 7.
Figure 9:
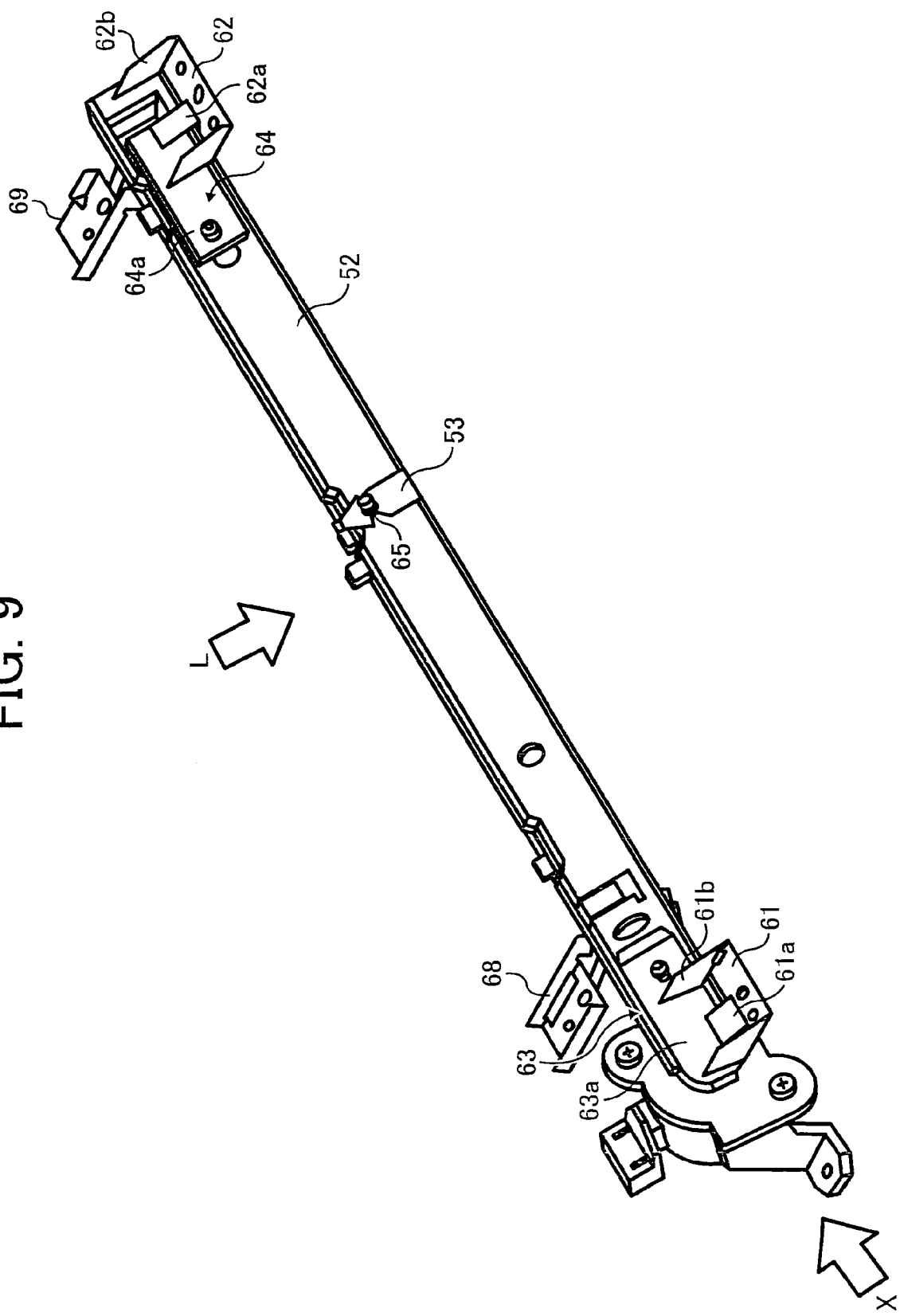
FIG. 9 is another perspective view of a lens unit of FIG. 7.

FIGS. 7 to 9 are perspective views of the lens unit 50, viewed from different angles.

The lens unit 50 includes a lens 51, and a bracket 52. The lens unit 50 may further includes a curving-adjusting leaf spring 53, a drive motor 56, a drive motor holder 57, a up-and-down screw 58, a housing fixing member 59, first and second unit supporters 61 and 62, first and second end member 63 and 64, and a curving-adjusting screw 65, for example.

The lens 51 may have a substantially rectangular parallelepiped shape as shown in FIGS. 7 to 9, for example. The lens 51 can be used to correct optical-face tangle error of polygon mirrors 41a and 41b. The bracket 52 holds the lens 51.

The drive motor 56 is encased in the drive motor holder 57 fixed to the housing of the optical writing unit 4.

The up-and-down screw 58 is attached to a motor shaft of the drive motor 56. An automatic adjustment of inclination of scanning line can be conducted with the drive motor 56 and up-and-down screw 58.

The first and second end member 63 and 64 include first and second smooth surfaces 63a and 64a having smaller friction coefficient. The first end members 63 and 64 may have a clip-like shape, for example.

When to assemble the lens unit 50, the first end member 63 is attached to one longitudinal end of the bracket 52. The first end member 63 can be attached to the one longitudinal end of the bracket 52 by clipping the first end member 63, for example.

Although not shown in FIG. 7, the drive motor 56 is fixed to the housing of the optical writing unit 4, and the drive motor 56 is placed below the one longitudinal end of the bracket 52, which is attached with the first end member 63. Hereinafter, such one longitudinal end of the lens unit 50 is referred as "motor side (or first end side)" of the lens unit 50.

As shown in 6, the first smooth surface 63a of the first end member 63 is placed on an upper face of the bracket 52.

On one hand, a back face (i.e., opposite face of the first smooth surface 63a) of the first end member 63 is placed on a back face of the bracket 52.

The back face of first end member 63 may be maintained in a contact condition with the up-and-down screw 58. Specifically, the back face of first end member 63 is contacted to an edge 58a (see FIG. 14) of the up-and-down screw 58.

When the drive motor 56 rotates, the edge 58a of up-and-down screw 58 can be moved in an upward or downward direction depending on a rotational direction and distance of the drive motor 56.

Although not shown, the back face of first end member 63 may include a hole to receive the up-and-down screw 58 moved by the drive motor 56, for example.

Furthermore, the second end member 64 can be fixed to another longitudinal end of the bracket 52 as shown in FIG. 7. For example, the second end member 64 can be fixed to another longitudinal end of by caulking method, for example. The second end member 64 can be fixed to the bracket 52 by other method, as required.

Because another longitudinal end of the bracket 52 does not face the drive motor 56, such another longitudinal end of the bracket 52 is referred as free end side (or second end side) of the bracket 52, hereinafter.

As shown in FIG. 7, the second end member 64 is attached to the bracket 52 while the second smooth surface 64a of the second end member 64 is placed on an upper face of the bracket 52.

Figure 12:
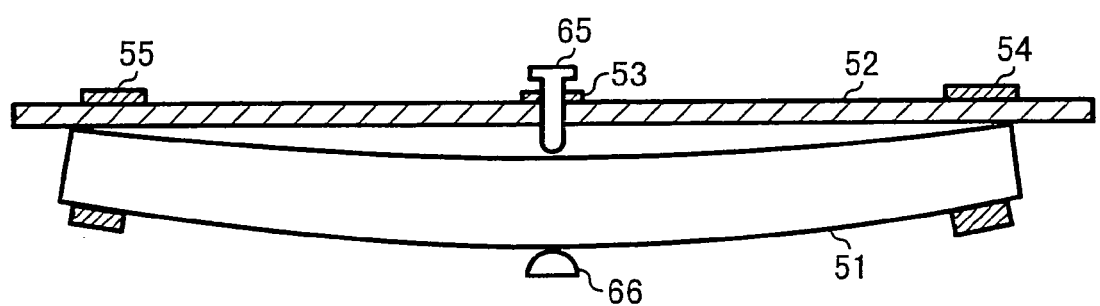
FIG. 12 is a schematic view explaining a method of adjusting a curving of scanning line for an optical writing unit of FIG. 6.

When assembling the lens 51 to the bracket 52, the lens 51 is positioned and contacted to the bracket 52, and then the lens 51 is fixed to the bracket 52 at both longitudinal end of the lens 51 with fixing leaf springs 54 and 55 (see FIG. 12).

The fixing leaf springs 54 and 55 may have a U-shaped form, by which the lens 51 and the bracket 52 can be sandwiched and fixed at both longitudinal end of the lens 51.

Figure 10:
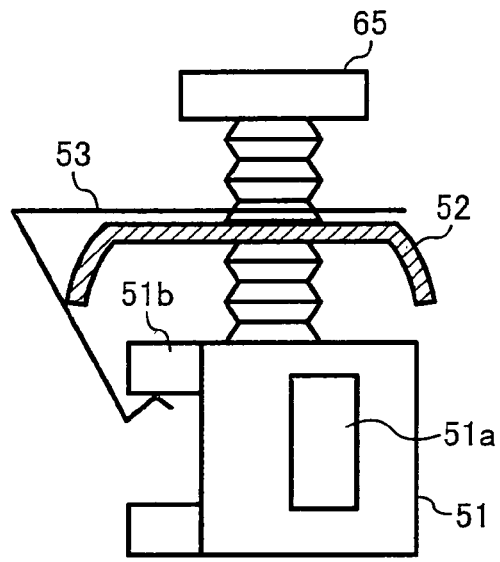
FIG. 10 is a schematic cross-sectional view explaining an adjuster for adjusting curving of a lens unit.

As shown in FIG. 10, the lens 51 includes a projection 51b at a center portion of the lens 51.

As shown in FIG. 10, the curving-adjusting leaf spring 53 sandwiches the projection 51b and bracket 52.

The lens 51 can be positioned and pressed to the bracket 52 with biasing force of the fixing leaf springs 54 and 55, and curving-adjusting leaf spring 53.

Furthermore, the bracket 52 has a screw hole (not shown), wherein the screw hole is used to attach the curving-adjusting leaf spring 53 to the bracket 52. The curving-adjusting leaf spring 53 also has a hole (not shown).

Accordingly, as shown in FIG. 10, the curving-adjusting screw 65 can be inserted in the screw hole (not shown) of the curving-adjusting leaf spring 53 and the hole (not shown) of the bracket 52. The curving-adjusting screw 65 will be explained later.

The lens unit 50 can be assembled with the above-explained processes.

Then, as shown in FIG. 7, the lens unit 50 can be placed on a support member 66 having hog-backed shape, which is fixed on the housing of the optical writing unit 4.

As shown in FIG. 7, the lens 51 contacts the support member 66 at center of bottom face of the lens 51. The support member 66 can be used as a fulcrum of the lens unit 50.

Furthermore, the drive motor holder 57, holding the drive motor 56, is fixed to the housing by the housing fixing member 59.

With such configuration, the up-and-down screw 58 can be placed below the motor side (or first end side) of the bracket 52. With such configuration, a movement of the lens unit 50 in a direction parallel to the light beam L can be regulated at the motor side (or first end side) of the lens unit 50.

As shown in FIG. 7, the lens 51 includes a projection 51a at one longitudinal end of the lens 51, which is opposite to the motor side (or first end side) of the lens 51. Hereinafter such longitudinal end of the lens 51 is referred as "free end side (or second end side)" of the lens 51, as required.

Figure 11:
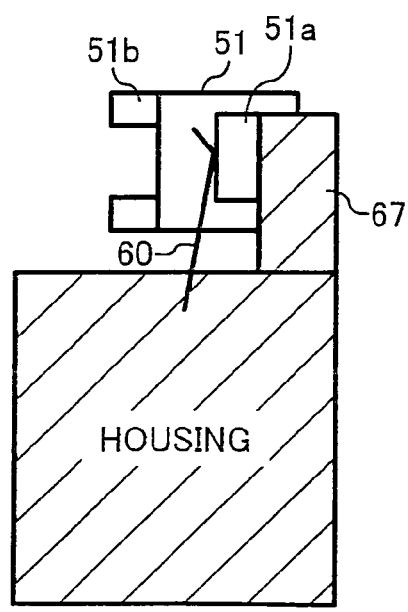
FIG. 11 is a schematic cross-sectional view explaining a supporter for supporting a lens unit at a free end side of a lens unit.

As shown in FIG. 11, the projection 51a has two faces, which are perpendicular to a light path direction of the light beam L. One face of the projection 51a contacts a fixing member 67 of the housing, and another face of the projection 51a contacts a support leaf spring 60 fixed to the housing.

With such configuration, the free end side (or second end side) of the lens 51 can be positioned and pressed to the fixing member 67 of the housing by the support leaf spring 60.

With such configuration, a movement of the lens unit 50 in a direction parallel to the light beam L can be also regulated at the free end side (or second end side) of the lens unit 50.

In example embodiment, as shown in FIG. 7, a first unit supporter 61 and a second unit supporter 62 are provided for the lens unit 50 so that the first unit supporter 61 and second unit supporter 62 can contact the upper face of the bracket 52 at each longitudinal end of the bracket 52 with a given condition to be described later.

As shown in FIG. 15, the first and second unit supporters 61 and 62 can be fixed to the housing of the optical writing unit 4 by a fastening member such as screw SC.

The first unit supporter 61 and second unit supporter 62 respectively include plate springs 61a and 62a as shown in FIGS. 8, 9, and 15. The plate springs 61a and 62a are maintained at a contact condition with the lens unit 50 in a normal condition.

The plate springs 61a and 62a can apply biasing force to the bracket 52 at the each longitudinal end of the bracket 52 so that the bracket 52 can be pressed from the upper face side to bottom face side of the bracket 52.

Accordingly, as above described, the lens unit 50 can be supported by the up-and-down screw 58 attached to the drive motor 56, the first plate spring 61a of the first unit supporter 61, the plate spring 62a of the second unit supporter 62, and the support member 66.

Therefore, the lens unit 50 can be supported from a first direction, which is perpendicular to a longitudinal direction of lens 51, and the lens 51 can be also supported from a second direction, which is perpendicular to the light path direction of light beam L, by which the lens unit 50 can be supported securely while allowing some movement of the lens unit 50.

A detail explanation for positional relationships of lens unit 50, first unit supporter 61, second unit supporter 62, and other regulating member will be explained later with reference to FIG. 15.

Hereinafter, a method of adjusting a curving of scanning line in the optical writing unit 4 is explained with reference to FIG. 12. FIG. 12 is a schematic view explaining a method of adjusting a curving of scanning line in the optical writing unit 4.

Such adjustment for curving of scanning line may be conducted before shipping an image forming apparatus from a factory, for example.

Specifically, the adjustment of curving of a scanning line may be conducted as below.

When the curving-adjusting screw 65 is in a non-contact condition with the lens 51, the curving-adjusting screw 65 may not effect to the lens 51. In such condition, the curving-adjusting leaf spring 53 biases the center portion of the lens 51 to the bracket 52.

If the curving-adjusting screw 65 is screwed toward the lens 51 from such condition, an end edge of the curving-adjusting screw 65 may contact the center portion of the lens 51 as shown in FIG. 12, by which a distance between the center portion of the lens 51 and the bracket 52 may become greater.

The lens 51 is fixed to the bracket 52 by the fixing leaf springs 54 and 55 at both longitudinal end of the lens 51.

The lens 51 has a first rigidity, and the bracket 52 has a second rigidity, which is larger than the first rigidity of the lens 51.

Accordingly, if the curving-adjusting screw 65 is screwed toward the lens 51, the lens 51 may warp in the longitudinal direction of the lens 51 as shown in FIG. 12.

Such warping of the lens 51 may change a curving condition of scanning line on an image carrier such as photoconductive member, wherein the scanning line is formed by the laser beam L.

Accordingly, a curving of scanning line can be adjusted by screwing the curving-adjusting screw 65 toward the lens 51 by considering several factors of the lens unit 50 such as optical or physical property of optical parts.

Hereinafter, a method of adjusting an inclination of scanning line for the optical writing unit 4 is explained with reference to FIG. 13.

Figure 13:
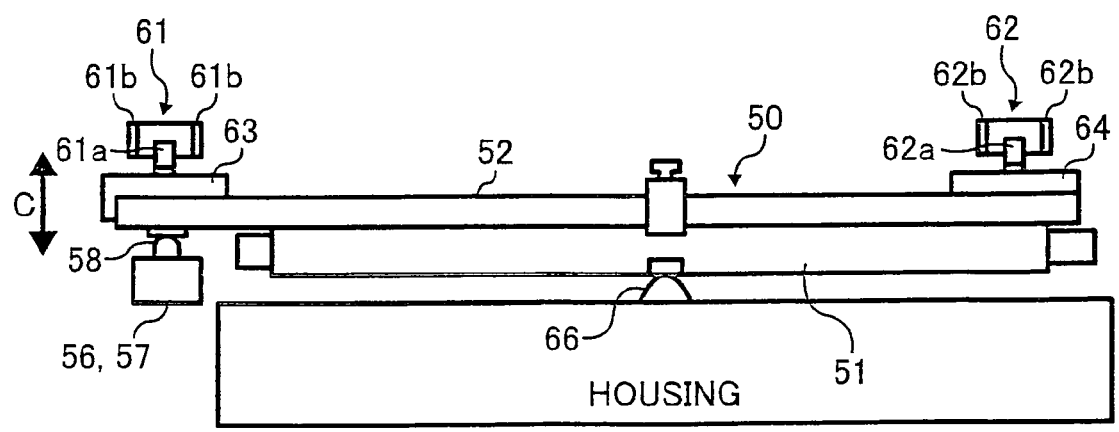
FIG. 13 is a schematic view explaining a method of adjusting an inclination of scanning line for an optical writing unit of FIG. 6.

FIG. 13 is a schematic view explaining a method of adjusting an inclination of scanning line for the optical writing unit 4.

Such adjustment for an inclination of scanning line may be conducted before shipping an image forming apparatus from a factory, or may be conducted after an image forming apparatus produces a given number of printings, or may be conducted when receiving a user instruction at a given timing, for example.

Specifically, the adjustment of inclination of a scanning line may be conducted as below.

At first, a latent image of test image pattern is formed on each of the photosensitive members 10Y, 10C, 10M, and 10K by conducting a normal image forming operation. The test image pattern is used for adjusting an inclination of scanning line.

Then, the latent image of test image pattern is developed on each of the photosensitive members 10Y, 10C, 10M, and 10 K as toner image by conducting a normal image forming operation, and then the toner images of test image pattern are transferred onto the intermediate transfer belt 20.

Then, a pattern sensor (not shown) such as optical sensor checks the toner image of test image pattern transferred onto the intermediate transfer belt 20.

Based on detection results by the pattern sensor, a CPU (control process unit) of the image forming apparatus 1 recognizes a positional displacement between a test image pattern for black(K) and test image patterns for other colors (e.g., Y, C, and M).

The CPU compares an inclination amount of scanning line for other colors (e.g., Y, C, and M) with respect to the inclination of scanning line for black(K), and computes an inclination adjustment value, which can minimize a difference between the inclination of scanning line for black(K) and the inclination of scanning lines for other colors (e.g., Y, C, and M).

The CPU outputs such inclination adjustment value to an inclination controller (not shown). The inclination controller controls a rotation angle of the drive motor 56 by referring the inclination adjustment value.

Then, the up-and-down screw 58 attached to the drive motor 56 can be moved in a direction shown by arrow C in FIG. 13, by which the motor side (or first end side) of the lens unit 50 can be moved in a direction shown by arrow C. The up-and-down screw 58 may be moved in an upward or downward direction, as required, by controlling a rotation amount of the drive motor 56.

Specifically, if the up-and-down screw 58 is moved in an upward direction, the motor side (or first end side) of the lens unit 50 can be moved in an upward direction even though the first plate spring 61a of the first unit supporter 61 applies biasing force to the lens unit 50.

Then, the lens unit 50 can be tilted in one direction in FIG. 13 using the support member 66 as fulcrum, by which and a posture of the lens unit 50 can be changed. For example, the lens unit 50 can be tilted from left to right in FIG. 13.

On one hand, if the up-and-down screw 58 is moved in a downward direction, the motor side (or first end side) of the lens unit 50 can be moved in a downward direction with a biasing force of the first plate spring 61a of the first unit supporter 61.

Then, the lens unit 50 can be tilted in another direction in FIG. 13 using the support member 66 as fulcrum, by which a posture of the lens unit 50 can be changed. For example, the lens unit 50 can be tilted from right to left in FIG. 13.

If the lens unit 50 changes its posture with the above-described process, an incidence position of laser beam L to an incidence plane of the lens 51 may change.

If such change occurred to the lens 51, the laser beam L outgoes from an outgoing plane of the lens 51 by changing an outgoing angle of laser beam L from the outgoing plane of the lens 51 depending on a level of posture change of lens unit 50. In other words, a posture change of the lens unit 50 may change an outgoing angle of the laser beam from an outgoing plane of the lens 51.

As above described, when the up-and-down screw 58 is moved into one direction, the lens unit 50 may change its posture, by which the outgoing angle of laser beam L from the outgoing plane of the lens 51 may be changed.

Accordingly, an inclination of scanning line on the image carrier such as photosensitive member can be adjusted by moving the up-and-down screw 58.

Figure 14:
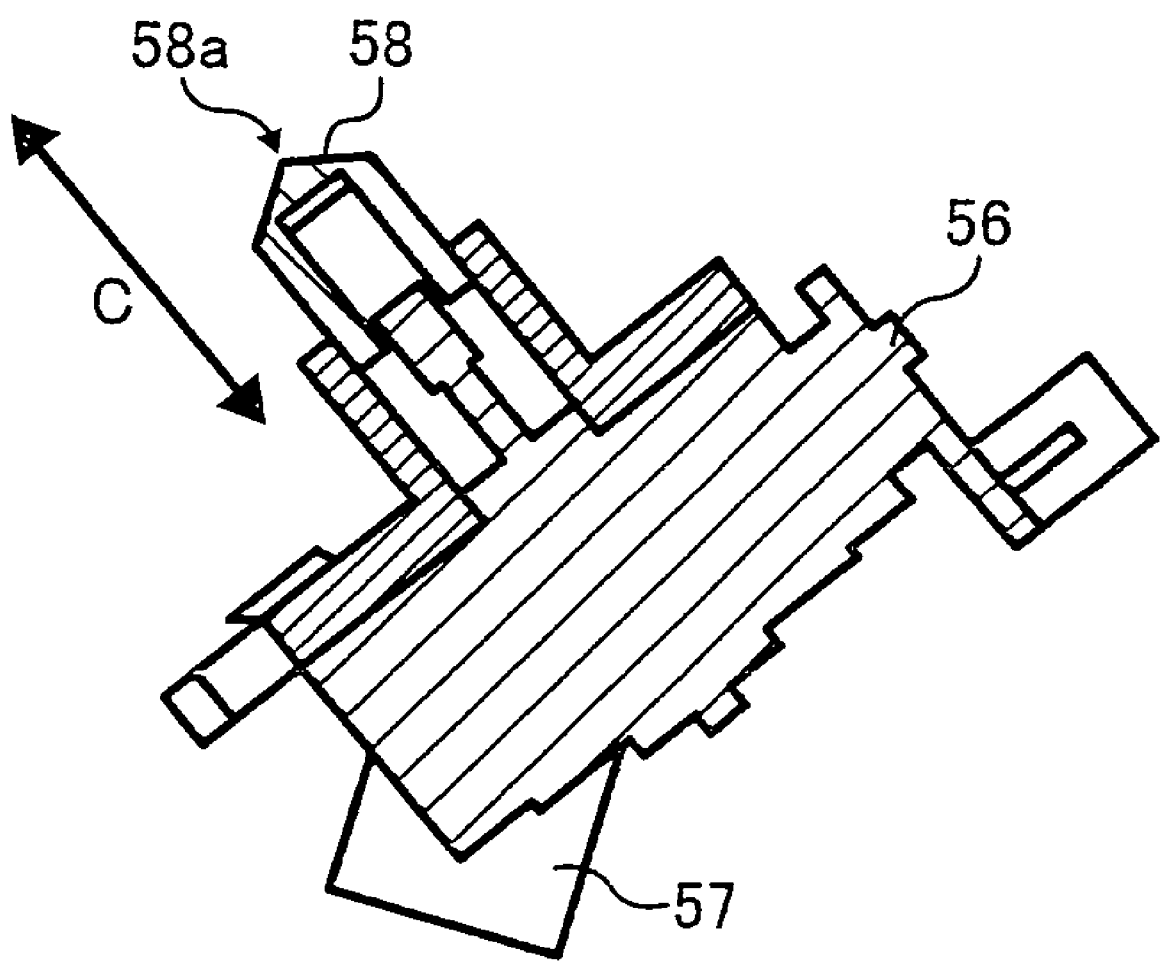
FIG. 14 is a cross-sectional view of a drive motor used for controlling a posture of a lens unit of FIG. 7.

FIG. 14 is a cross-sectional view of the drive motor 56. With a rotation of the drive motor 56, the up-and-down screw 58 can be moved in a direction shown by an arrow C (see FIGS. 7, 8, 13, and 14), and the edge 58a of the up-and-down screw 58 can change its position depending on rotation amount of the drive motor 56.

When the edge 58a of the up-and-down screw 58W changes its position, the motor side (or first end side) of the lens unit 50 may changes its position because the edge 58a of the up-and-down screw 58W is in a contact condition with the motor side (or first end side) of the lens unit 50.

Then, the lens unit 50 can tilt in one direction using the support member 66 as fulcrum in FIG. 13, by which a posture of the lens unit 50 can be changed.

A posture change range of the lens unit 50, changeable with a positional change of the edge 58a of the up-and-down screw 58, is preferably matched to an adjustment effective range of the lens unit 50.

The adjustment effective range of the lens unit 50 may be determined by several factors such as optical or physical property of lens, shape of lens, physical property of non-optical parts, usage condition or environment, for example. Such adjustment effective range of the lens unit 50 is set for maintaining characteristics of the optical writing unit 4 at a preferable level.

If the posture change range of the lens unit 50 may not be substantially matched to an adjustment effective range of the lens unit 50, unfavorable phenomenon may occur as below.

For example, if the posture change range of the lens unit 50 is set larger than the adjustment effective range of the lens unit 50, an incidence light to the lens unit 50 may not enter to an incidence plane of the lens 51 within preferable angles, by which an inclination of scanning line may not be adjusted correctly.

On one hand, if the posture change range of the lens unit 50 is set smaller than the adjustment effective range of the lens unit 50, the posture of the lens unit 50 may not be changed to a maximum limit of the adjustment effective range of the lens unit 50, which is not preferable from a view point of securing a range for adjusting an inclination of scanning line as much as possible.

In an example embodiment, the drive motor 56, up-and-down screw 58, and other parts can be designed and engineered so that the posture change range of the lens unit 50 can be substantially matched to the adjustment effective range of the lens unit 50.

However, some unfavorable factors such as manufacturing error, assembly error or the like may become a bottleneck to match the posture change range of the lens unit 50 within the adjustment effective range of the lens unit 50. Such condition may not be preferable for adjusting an inclination of scanning line.

In view of such drawback, in an example embodiment, the first unit supporter 61 includes a first regulating member 61b, which can regulate the posture change range of the lens unit 50.

Specifically, the first regulating member 61b regulates the lens unit 50 so that the lens unit 50 can change its posture within the adjustment effective range of the lens unit 50.

As shown in FIG. 13, the first unit supporter 61 includes the first plate spring 61a and the first regulating member 61b. FIG. 13 schematically shows the first unit supporter 61 having the first plate spring 61a and the first regulating member 61b, shown in a perspective view of FIG. 9.

The first regulating member 61b can be integrally formed with the first plate spring 61a made of elastically deformable member.

As shown in FIG. 13, the first unit supporter 61 and up-and-down screw 58 are disposed in opposite faces of the lens unit 50 each other, and the first unit supporter 61 can contact the lens unit 50 and regulate a movement of the lens unit 50 within a given distance.

Hereinafter, a positional relationship of the first unit supporter 61 and lens unit 50 is explained with reference to FIG. 15.

FIG. 15 is a schematic cross-sectional view of the lens unit 50 for explaining positional relationships of the lens unit 50 and regulating members, which is viewed from a direction X shown in FIG. 9. FIG. 15 omits some parts from the drawing for the purpose of explanation of the positional relationships of the lens unit 50 and regulating members.

As shown in FIG. 15, the first unit supporter 61 can be fixed at a given position of the housing of the optical writing unit 4 with a fastening member such as screw SC.

As shown in FIG. 15, the first unit supporter 61 fixed on the housing has a clearance M between the first regulating member 61b and the lens unit 50.

The clearance M can be set to a distance, which can regulate (or limit) a movement (or posture change) of the lens unit 50 within the adjustment effective range of the lens unit 50.

Under a normal condition, a movement (or posture change) of the lens unit 50 can be regulated within the adjustment effective range of the lens unit 50 by biasing force of the first plate spring 61a.

However, if a greater force may be applied to the optical writing unit 4 due to some reasons, the first plate spring 61a alone cannot regulate a movement (or posture change) of the lens unit 50 within the adjustment effective range of the lens unit 50.

In an example embodiment, as shown in FIG. 15, the first unit supporter 61 can be fixed on the housing while setting the clearance M with the lens unit 50 as above-mentioned.

Therefore, even if a greater force may be applied to the lens unit 50, the first regulating member 61b of the first unit supporter 61 can regulate (or limit) a movement (or posture change) of the lens unit 50 within the adjustment effective range of the lens unit 50.

With such configuration, even if the lens unit 50 is biased with a greater force by the up-and-down screw 58, the first regulating member 61b can regulate and limit a movement of the lens unit 50 securely, by which the posture change range of the lens unit 50 may not exceed the adjustment effective range of the lens unit 50.

Accordingly, an adjustment of an inclination of scanning line can be conducted within the adjustment effective range of the lens unit 50.

Furthermore, during a transportation of the image forming apparatus 1 or optical writing unit 4 from a factory or service center, an external shock may occur to the optical writing unit 4 by several factors such as vibration during transportation, harsh treatment by service person or the like.

If such external shock may occur, a position of the motor side (or first end side) of the lens unit 50 may be significantly deviated from an original position set in the factory although the first plate spring 61a may apply biasing force to the motor side (or first end side) of the lens unit 50.

When such external shock occurs to the optical writing unit 4, the edge 58a of the up-and-down screw 58 and the motor side (or first end side) of the lens unit 50 may be disengaged instantaneously, and then the edge 58a of the up-and-down screw 58 and the motor side (or first end side) of the lens unit 50 may be contacted again with a biasing force of the first plate spring 61a.

If the edge 58a of the up-and-down screw 58 and the motor side (or first end side) of the lens unit 50 can be contacted again with an original condition set in the factory, the optical writing unit 4 may be used without trouble.

However, if the edge 58a of the up-and-down screw 58 and the motor side (or first end side) of the lens unit 50 cannot be contacted again with an original condition set in the factory, the optical writing unit 4 may have trouble for image forming.

For example, such trouble includes a complete disengagement of the edge 58a of the up-and-down screw 58 from the bracket 52, and a plastic deformation of the first plate spring 61a and resultant change of biasing pressure of the first plate spring 61a.

Accordingly, if such external shock occurs to the optical writing unit 4, an adjustment of an inclination of scanning line may not be conducted correctly because the edge 58a of the up-and-down screw 58 and the motor side (or first end side) of the lens unit 50 may not be contacted again with the original condition set in the factory.

A configuration according to an example embodiment may prevent such drawback, which is explained as below.

As above explained with reference to FIG. 15, the first regulating member 61b can regulate a movement of the lens unit 50 within the adjustment effective range of the lens unit 50. Such configuration can be used to prevent the above-mentioned drawback caused by an external shock.

Specifically, in a configuration according to an example embodiment, the first unit supporter 61 can be fixed on the housing while setting the clearance M between the first regulating member 61b and the lens unit 50 as above explained with FIG. 15.

The clearance M can be set to a distance, which can regulate (or limit) a movement (or posture change) of the lens unit 50 within a range that can prevent disengagement of the edge 58a of the up-and-down screw 58 from the motor side (or first end side) of the lens unit 50, and can prevent plastic deformation of the first plate spring 61a.

Specifically, the first regulating member 61b can be contacted to the lens unit 50 at a given timing so that a disengagement of the edge 58a of the up-and-down screw 58 from the motor side (or first end side) of the lens unit 50 and plastic deformation of the first plate spring 61a can be prevented even if an abrupt movement of lens unit 50 may occur due to an external shock.

Accordingly, the up-and-down screw 58 and the lens unit 50 can maintain a same contact condition before and after an external shock occurs to the optical writing unit 4.

Therefore, an adjustment of inclination of a scanning line can be conducted correctly even if an external shock occurs to the optical writing unit 4.

Such external shock may occur to the optical writing unit 4 if the optical writing unit 4 is fallen from a higher place, for example.

In order to minimize a movement of the lens unit 50 by such external shock, the first regulating member 61b preferably has a greater rigidity. On one hand, the first plate spring 61a preferably has a relatively smaller rigidity to maintain a biasing force at an appropriate level.

A rigidity of the first plate spring 61a needs fine-tuning because a greater rigidity may cause to fix the lens unit 50 at a displaced position when the lens unit 50 is displaced from an original position by an external shock, and a too-small rigidity may not be enough for retaining the lens unit 50 at an original position and may displace the lens unit 50 from an original position when even a small shock occurs.

Therefore, in order to maintain a biasing force of the first plate spring 61a at an appropriate level and to minimize a movement of the lens unit 50 concurrently when an external shock occurs, the first plate spring 61a and the first regulating member 61b may be manufactured as separate parts having different rigidity and assembled later as the first unit supporter 61.

However, such manufacturing process may not be preferable from a viewpoint such as increased number of parts and resultant complexity of assembly works.

In view of such drawback, in an example embodiment, the first plate spring 61a and first regulating member 61b can be integrally formed as the first unit supporter 61.

In such a case, the first plate spring 61a may be made with a relatively smaller rigidity, and the first regulating member 61b may be made with a relatively greater rigidity with a known manufacturing method.

Such configuration may preferably reduce numbers of parts to be used, and may preferably set the rigidity of the first plate spring 61a to a relatively smaller value and the rigidity of the first regulating member 61b to a relatively greater value.

In an example embodiment, as shown in FIGS. 7 to 9, the first unit supporter 61 includes two first regulating members 61b to regulate a movement of the lens unit 50, for example.

Accordingly, the first plate spring 61a may apply a biasing force having an appropriate level to the lens unit 50 during a normal operating condition, and the first regulating member 61b may regulate a movement of the lens unit 50 when an external shock occurs to the optical writing unit 4.

Furthermore, in an example embodiment, the second unit supporter 62 may further include a second regulating member 62b.

As shown in FIG. 15, the second unit supporter 62 can be fixed on the housing of the optical writing unit 4 as similar to the first unit supporter 61.

Therefore, the second regulating member 62b may regulate a movement (or posture change) of the lens unit 50 as similar to the first regulating member 61b.

Specifically, the second regulating member 62b may regulate a movement (or posture change) of the lens unit 50 within the adjustment effective range of the lens unit 50 when the motor side (or first end side) of the lens unit 50 is moved in a downward direction by the up-and-down screw 58.

Accordingly, an adjusting of inclination of a scanning line can be conducted within the adjustment effective range of the lens unit 50.

As can be seen in FIGS. 7 to 9, the first unit supporter 61 including the first regulating member 61b and the second unit supporter 62 including the second regulating member 62b are disposed substantially symmetrically at each longitudinal end of the lens unit 50.

Therefore, when the motor side (or first end side) of the lens unit 50 is moved toward the first unit supporter 61, the first unit supporter 61 may contact and regulate a movement (or posture change) of the lens unit 50 while the second unit supporter 62 may not contact the lens unit 50. On one hand, when the motor side (or first end side) of the lens unit 50 is moved away from the first unit supporter 61, the second unit supporter 62 may contact and regulate a movement (or posture change) of the lens unit 50 while the first unit supporter 61 may not contact the lens unit 50.

The first unit supporter 61 and the second unit supporter 62 are configured with substantially similar parts, which can function in a substantially similar manner.

From a viewpoint of parts manufacturing cost, the first unit supporter 61 and the second unit supporter 62 are configured with substantially same parts, however, the first unit supporter 61 and the second unit supporter 62 may be configured with parts having different shapes having similar function due to some factors such as design restriction or the like in the optical writing unit, as required.

In an example embodiment, when the drive motor 56 moves the up-and-down screw 58 in an upward direction, the first regulating member 61b of the first unit supporter 61 may contact the lens unit 50 so that the first regulating member 61b may forcibly regulate a movement (or posture change) of the lens unit 50 within the adjustment effective range of the lens unit 50.

In such a condition, the drive motor 56 may receive a greater stress because the first regulating member 61b forcibly regulates the lens unit 50.

Such greater stress to the drive motor 56 may be reduced by setting the posture change range of the lens unit 50 smaller than the adjustment effective range of the lens unit 50.

Specifically, in order to reduce such greater stress to the drive motor 56, a configuration, in which the first regulating member 61b of the first unit supporter 61 may not contact with the lens unit 50 even if the motor side (or first end side) of the up-and-down screw 58 is moved to a uppermost position, can be designed for the optical writing unit 4.

If such design is employed for the optical writing unit 4, a posture of the lens unit 50 may not be changed to a maximum limit of adjustment effective range of the lens unit 50, by which an actual adjustment range for scanning line may become smaller than the adjustment effective range of the lens unit 50.

However, even in such design, the first supporter unit 61 having the regulating member 61b may be fixed on a given position of the housing of the optical writing unit 4 so that the first regulating member 61b can contact the lens unit 50 if an external shock may occur to the optical writing unit 4.

Specifically, as described in the above-explanation, the first regulating member 61b may not contact the lens unit 50 when adjusting scanning line under a normal operating condition. The normal operating condition refers to the fact that the optical writing unit 4 can be operated without trouble such as external shock, for example.

However, if an external shock occurs to the optical writing unit 4, the first regulating member 61b may contact the lens unit 50 to prevent disengagement of the edge 58a of the up-and-down screw 58 from the motor side (or first end side) of the lens unit 50, and to prevent plastic deformation of the first plate spring 61a.

Accordingly, in such design, the lens unit 50 may change its posture within the adjustment effective range of the lens unit 50 without causing a greater stress to the drive motor 56, and can adjust inclination of a scanning line correctly even if an external shock may occur to the optical writing unit 4.

The above explanation explains a case that the lens unit 50 is moved in a direction shown by an arrow C in FIG. 8 when an external shock occurs to the optical writing unit 4, wherein the direction shown by an arrow C is substantially perpendicular to a light path direction of the light beam L.

In addition to such movement, the lens unit 50 may be moved in a direction, which is parallel to a light path direction of the light beam L, when an external shock may occur to the optical writing unit 4. The light path direction the light beam L is perpendicular to the direction shown by an arrow C in FIG. 8.

When such shock occurs to the optical writing unit 4, the lens unit 50 may be disengaged from the housing of the optical writing unit 4.

In view of such phenomenon, the optical writing unit 4 further includes movement-restriction members 68 and 69 as shown in FIGS. 8 and 9.

As shown in FIG. 15, the movement-restriction members 68 and 69 can be fixed on the housing of the optical writing unit 4 while securing some clearance with the lens unit 50. The movement-restriction members 68 and 69 include leaf springs 54a and 55a.

The leaf springs 54a and 55a are formed integrally with the movement-restriction members 68 and 69, for example.

The movement-restriction members 68 and 69 have a relatively greater rigidity and the leaf springs 54a and 55a have a relatively smaller rigidity as similar to the first and second regulating members 61b and 62b, and the plate springs 61a and 62a.

The movement-restriction members 68 and 69 can prevent a disengagement of the lens unit 50 from the housing of the optical writing unit 4 when an external shock may occur to the optical writing unit 4.

Under a normal condition, the leaf springs 54a and 55a having a relatively smaller rigidity can retain the optical lens unit 50 at an appropriate position with biasing force of the leaf springs 54a and 55a. However, such leaf springs 54a and 55a may not have enough biasing force to retain the optical lens unit 50 at the appropriate position when an external shock occurs to the optical writing unit 4.

In a configuration shown in FIGS. 7, 8, 9 and 15, the movement-restriction members 68 and 69 having a relatively greater rigidity may contact the lens unit 50 when an external shock occurs to the optical writing unit 4 and the lens unit 50 is subsequently moved toward the movement-restriction members 68 and 69.

Accordingly, the movement-restriction members 68 and 69 may prevent a disengagement of the lens unit 50 from the housing of the optical writing unit 4 in the light path direction of the light beam L.

In an example embodiment, the first unit supporters 61 and the movement restriction member 68 are separate parts, and the second unit supporter 62 and the movement restriction member 69 are also separate parts. However, the first unit supporter 61 and second unit supporter 62 may include a function of movement-restriction members 68 and 69. If the function of movement-restriction members 68 and 69 is integrated to the first unit supporter 61 and second unit supporter 62, numbers of parts to be used can be reduced, and thereby manufacturing cost of parts can be reduced.

In the above-described example embodiment, the optical writing unit 4 includes at least the up-and-down screw 58 and drive motor 56 for changing a posture of the lens unit. In other words, the up-and-down screw 58 and drive motor 56 can be termed as posture controlling unit.

The image forming apparatus 1 includes the optical writing unit 4 described in the above so that an inclination of scanning line may be precisely adjusted by adjusting the posture of the image lens unit 50 with the posture controlling unit.

The image forming apparatus 1 includes a plurality of photosensitive members in a tandem arrangement manner, and employs an intermediate transfer method for forming a full color image on the transfer sheet P (i.e., recording medium). In such image forming apparatus 1, even a slight inclination of scanning lines between the plurality of photosensitive members may cause an abnormal image, which may not be accepted by a user.

Accordingly, even such slight inclination of scanning lines needs to be adjusted in a higher precision. The optical writing unit 4 according to an example embodiment may conduct such adjustment of inclination of scanning line.

Furthermore, the optical writing unit 4 according to an example embodiment can also be applied to an image forming apparatus using a direct transfer method, in which toner images formed on each of photosensitive members are superimposingly and directly transferred to a transfer sheet.

Numerous additional modifications and variations are possible in light of the above teachings. It is therefore to be understood that within the scope of the appended claims, the disclosure of the present invention may be practiced otherwise than as specifically described herein.

What is claimed is:

1. A light-orientation adjusting unit for use with a light-receiving member, comprising:
   an optical unit to pass a light beam toward the light-receiving member, the optical unit being movable to change a posture of the optical unit;
   an inclination control unit to control the posture of the optical unit to adjust an inclination of scanning line to be formed on the light-receiving member by the light beam;
   a first regulating member to limit a movement of the optical unit, controlled by the inclination control unit, within a given range by contacting the first regulating member to the optical unit, the first regulating member being provided with a first biasing member and being disposed on a first end of an upper face of the optical unit; and
   a second regulating member to limit a movement of the optical unit, controlled by the inclination control unit, within a given range by contacting the second regulating member to the optical unit, the second regulating member being provided with a second biasing member and being disposed on a second end of the upper face of the optical unit, the second end being opposite to the first end of the optical unit, wherein the first regulating member is fixed at a given position while securing a clearance with the optical unit, and the first regulating member contacts the optical unit when the optical unit is moved for a distance of the clearance set between the optical unit and the first regulating member, and wherein the second regulating member is fixed at a given position while securing a clearance with the optical unit, and the second regulating member contacts the optical unit when the optical unit is moved for a distance of the clearance set between the optical unit and the second regulating member.

2. The light-orientation adjusting unit according to claim 1, wherein the first biasing member is made of elastically deformable material, and the first regulating member and the first biasing member are integrally formed, and wherein the second biasing member is made of elastically deformable material, the second regulating member and the second biasing member are integrally formed.

3. The light-orientation adjusting unit according to claim 2, wherein the first regulating member including the first biasing member and the second regulating member including the second biasing member are configured with substantially similar parts.

4. The light-orientation adjusting unit according to claim 2, wherein the first regulating member including the first biasing member and the second regulating member including the second biasing member are configured with substantially similar parts.

5. The light-orientation adjusting unit according to claim 1, wherein the inclination control unit includes:
   a contact member to be contacted with the optical unit; and
   a driver, connected to the contact member, to control a movement of the contact member contacted with the optical unit to move the optical unit into a given direction,
   wherein the contact member and the first biasing member are disposed at an opposite side of the first end of the optical unit, and the first biasing member and the contact member apply forces to the optical unit from opposite directions.

6. The light-orientation adjusting unit according to claim 5, wherein the inclination control unit controls a movement of the contact member to change the inclination of the optical unit while the optical unit and the first regulating member are not in contact with each other, and wherein the first regulating member contacts the optical unit to avoid a plastic deformation of the first biasing member, made of elastically deformable material, and a disengagement of the contact member from the optical unit.

7. The light-orientation adjusting unit according to claim 5, further comprising:
   a support member, used as a fulcrum, to support the optical unit by placement of a center of the optical unit on the support member, the support member allowing a movement of the optical unit in at least one of a first rotational direction and a second rotational direction.

8. The light-orientation adjusting unit according to claim 7, wherein the optical unit, placed on the support member, is rotatable in at least one of the first rotational direction and the second rotational direction with a movement of the contact member, and wherein the first regulating member including the first biasing member is used to limit a movement of the optical unit rotating in the first rotational direction, and the second regulating member including the second biasing member is used to limit a movement of the optical unit rotating in the second rotational direction.

9. The light-orientation adjusting unit according to claim 5, further comprising:
   a movement restriction member to restrict a movement of the optical unit in a direction of the light beam by contacting the movement restriction member with the optical unit to prevent a disengagement of the optical unit from the support member.

10. An optical writing unit for use with a light-receiving member, comprising:
    a light source to emit a light beam;
    an optical device to control and guide a light path of the light beam, emitted from the light source, to a surface of the light-receiving member; and
    a light-orientation adjusting unit to adjust an inclination of scanning line formed on the light-receiving member by the light beam, the light-orientation adjusting unit including,
        an optical unit to pass the light beam toward the light-receiving member, the optical unit being movable to change a posture of the optical unit, an inclination control unit to control the posture of the optical unit to adjust the inclination of scanning line to be formed on the light-receiving member by the light beam, a first regulating member to limit a movement of the optical unit, controlled by the inclination control unit, within a given range by contacting the first regulating member to the optical unit, the first regulating member being provided with a first biasing member and being disposed on a first end of an upper face of the optical unit, and a second regulating member to limit a movement of the optical unit, controlled by the inclination control unit, within a given range by contacting the second regulating member to the optical unit, the second regulating member being provided with a second biasing member and being disposed on a second end of an upper face of the optical unit, the second end being opposite to the first end of the optical unit, wherein the first regulating member is fixed at a given position while securing a clearance with the optical unit, and the first regulating member contacts the optical unit when the optical unit is moved for a distance of the clearance set between the optical unit and the first regulating member, and wherein the second regulating member is fixed at a given position while securing a clearance with the optical unit, and the second regulating member contacts the optical unit when the optical unit is moved for a distance of the clearance set between the optical unit and the second regulating member.

11. The optical writing unit of claim 10, wherein in the light-orientation adjusting unit, the first biasing member is made of elastically deformable material, and the first regulating member and the first biasing member are integrally formed, and wherein the second biasing member is made of elastically deformable material, and the second regulating member and the second biasing member are integrally formed.

12. The optical writing unit of claim 11, wherein in the light-orientation adjusting unit, the first regulating member includes rigidity relatively greater than the first biasing member, and wherein the second regulating member includes rigidity relatively greater than the second biasing member.

13. The optical writing unit of claim 11, wherein in the light-orientation adjusting unit, the first regulating member including the first biasing member and the second regulating member including the second biasing member are configured with substantially similar parts.

14. An image forming apparatus, comprising:
an image carrier;
an optical writing unit to write a latent image on a surface of the image carrier by scanning a light beam, corresponding to original image information, the optical writing unit including,
a light source to emit a light beam,
an optical device to control and guide a light path of the light beam, emitted from the light source, to a surface of the light-receiving member, and
a light-orientation adjusting unit to adjust an inclination of scanning line formed on the light-receiving member by the light beam, the light-orientation adjusting unit including,
an optical unit to pass through the light beam toward the light-receiving member, the optical unit being movable to change a posture of the optical unit, an inclination control unit to control the posture of the optical unit to adjust the inclination of scanning line to be formed on the light-receiving member by the light beam, a first regulating member to regulate limit a movement of the optical unit, controlled by the posture inclination control unit, within a given range by contacting the first regulating member to the optical unit, the first regulating member being provided with a first biasing member and being disposed on a first end of an upper face of the optical unit, and a second regulating member to limit a movement of the optical unit, controlled by the inclination control unit, within a given range by contacting the second regulating member to the optical unit, the second regulating member being provided with a second biasing member and being disposed on a second end of an upper face of the optical unit, the second end being opposite to the first end of the optical unit;

a developing unit to develop the latent image formed on the surface of the image carrier as visible image; and a transferring unit to transfer the visible image onto a recording medium, wherein the first regulating member is fixed at a given position while securing a clearance with the optical unit, and the first regulating member contacts the optical unit when the optical unit is moved for a distance of the clearance set between the optical unit and the first regulating member, and wherein the second regulating member is fixed at a given position while securing a clearance with the optical unit, and the second regulating member contacts the optical unit when the optical unit is moved for a distance of the clearance set between the optical unit and the second regulating member.

15. The image forming apparatus of claim 14, wherein in the light-orientation adjusting unit, the first biasing member is made of elastically deformable material, and the first regulating member and the first biasing member are integrally formed, and wherein the second biasing member is made of elastically deformable material, and the second regulating member and the second biasing member are integrally formed.

16. The image forming apparatus of claim 15, wherein in the light-orientation adjusting unit, the first regulating member includes rigidity relatively greater than the first biasing member, and wherein the second regulating member includes rigidity relatively greater than the second biasing member.

17. The image forming apparatus of claim 15, wherein in the light-orientation adjusting unit, the first regulating member including the first biasing member and the second regulating member including the second biasing member are configured with substantially similar parts.

18. The light-orientation adjusting unit according to claim 1, further comprising:
a curve adjusting unit to control a warping of the optical unit in order to change a curving condition of the scanning line on the light-receiving member, wherein
the first regulating member and the second regulating member maintain the curving condition while the inclination control unit adjusts the inclination of the scanning line on the light-receiving member,
the first regulating member and the second regulating member maintain the inclination of the scanning line on the light-receiving member while the curve adjusting unit controls the curving condition of the scanning line, and the first regulating member and the second regulating member do not affect the inclination of the scanning line and the curving condition if one of the inclination of the scanning line and the curving condition drift over time.

19. The optical writing unit of according to claim 10, further comprising:

a curve adjusting unit to control a warping of the optical unit in order to change a curving condition of the scanning line on the light-receiving member, wherein the first regulating member and the second regulating member maintain the curving condition while the inclination control unit adjusts the inclination of the scanning line on the light-receiving member, the first regulating member and the second regulating member maintain the inclination of the scanning line on the light-receiving member while the curve adjusting unit controls the curving condition of the scanning line, and the first regulating member and the second regulating member do not affect the inclination of the scanning line and the curving condition if one of the inclination of the scanning line and the curving condition drift over time.

20. The image forming apparatus according to claim 14, wherein the light-orientation adjusting unit includes, a curve adjusting unit to control a warping of the optical unit in order to change a curving condition of the scanning line on the light-receiving member, wherein the first regulating member and the second regulating member maintain the curving condition while the inclination control unit adjusts the inclination of the scanning line on the light-receiving member, the first regulating member and the second regulating member maintain the inclination of the scanning line on the light-receiving member while the curve adjusting unit controls the curving condition of the scanning line, and the first regulating member and the second regulating member do not affect the inclination of the scanning line and the curving condition if one of the inclination of the scanning line and the curving condition drift over time.

\* \* \* \* \*